April 7, 1942.   S. C. HEIST   2,279,044

MOLD FOR ELECTRIC WELDING

Filed Feb. 26, 1940

Solomon C. Heist
INVENTOR

BY Victor J. Evans & Co.
ATTORNEYS

Patented Apr. 7, 1942

2,279,044

UNITED STATES PATENT OFFICE 2,279,044

MOLD FOR ELECTRIC WELDING

Solomon C. Heist, Hollsopple, Pa.

Application February 26, 1940, Serial No. 320,904

1 Claim. (Cl. 22—116)

This invention relates to methods of electric arc welding and its general object is to provide a method by which the ends of trolley, power or other line wires can be welded together without removing the lines from service, in that the welding thereof can be accomplished in an easy and expeditious manner, while the wires are supported in use, and a joint is made between the ends of the wires, of sufficient strength to eliminate any possibility of breakage or separation, as well as provides a perfect conductor.

A further object is to provide a mold for use in arc welding the ends of wire lines together, that not only clamps the end portions of the wires in true alignment, but renders the underside of the joint provided between the ends smooth and flush with the wires, so as to not interfere with the free running action of the wheel of a trolley pole thereon.

Another object is to provide a mold that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
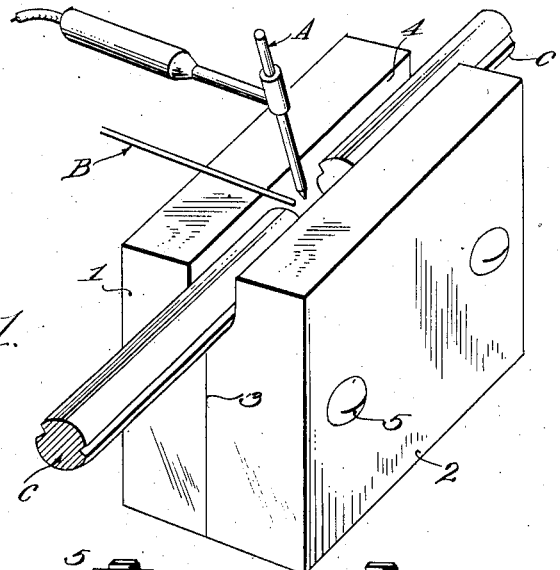
Figure 1 is a perspective view illustrating my mold in use for carrying out my method for welding the ends of trolley line wires together.

Referring to the drawing in detail, the letter A indicates the electrode of an arc welding tool of the usual construction, and B a copper welding rod which are used with my mold to carry out my method of joining the ends of trolley, power or other line wires together without taking the line out of service. While I have illustrated my mold in clamping association with the end portions of trolley line wires C for welding a joint between the ends thereof by my method for connecting the same together, it will be obvious that any type of line can be welded thereby.

The mold which of course is the gist of my invention, is in the form of a block that includes a pair of companion clamping sections 1 and 2, each being identical and made from carbon into relatively narrow substantially rectangular formation to provide flat confronting faces 3 recessed throughout the length of the inner upper edges thereof, so that when the sections are clamped together the recesses cooperate with each other to provide a mold groove 4 that extends along the longitudinal center of the top of the mold, as clearly shown in Figure 1.

Figure 2:
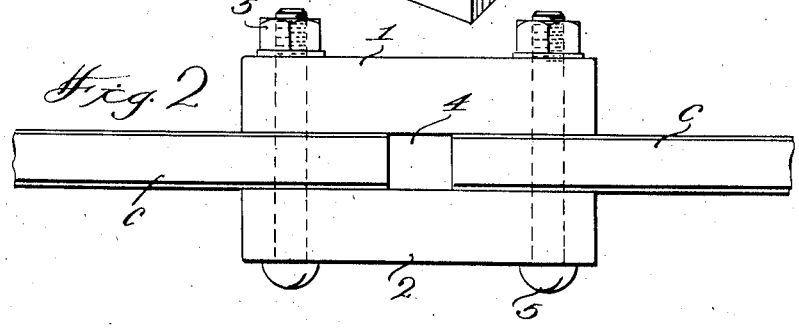
Figure 2 is a top plan view of the mold, with the end portions of the line wires disposed within the groove thereof.
Figure 3:
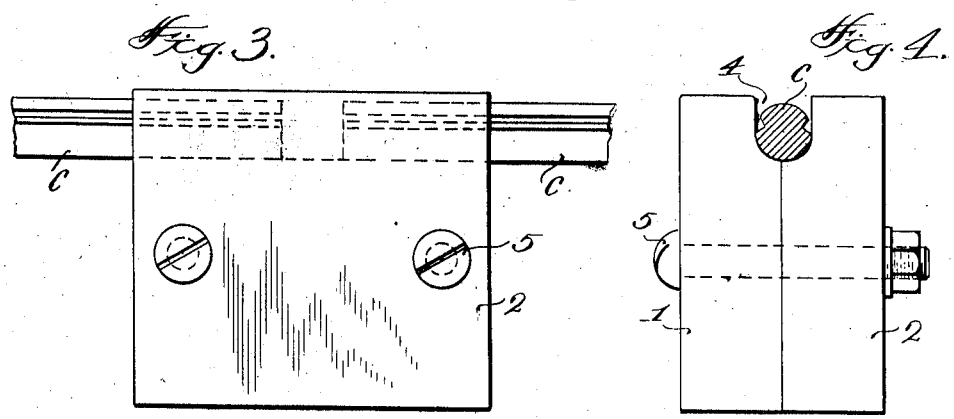
Figure 3 is a side elevation of Figure 1.
Figure 4:
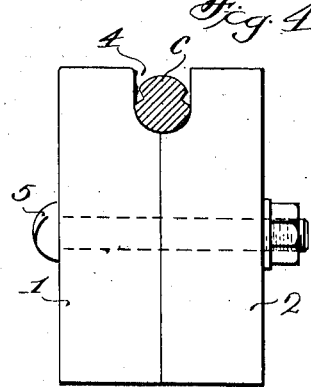
Figure 4 is an end view of Figure 1.

Each of the sections is provided with a pair of parallel bores extending transversely therethrough and arranged so that the bores of one section register with those of the other section for the purpose of receiving the bolts of bolt and nut connections 5 for securing the sections together so that the walls of the recesses will set up a clamping engagement with the end portions of the line wires to hold the same in true alignment with each other, as best shown in Figure 2.

Figure 5:
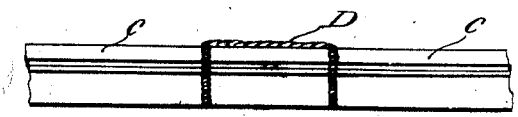
Figure 5 is a side elevation of a trolley wire line after the ends thereof have been welded together by the use of my mold.

From the foregoing, and the disclosure in the drawing, it is believed that the use of my mold will be obvious, but it might be mentioned that in carrying out my method, the end portions of the line wires C are clamped in the mold grove and spaced a short distance apart, as shown. The tool A is connected to one side of a suitable source of current and the mold to the return side thereof, thence the tool and the rod B are used to cast a joint D as shown in Figure 5 between the ends of the wires C, with the result it will be seen that the wires are connected together against any possibility of breakage or separation, and that the joint provides a perfect conductor. Due to the fact that the groove 4 is of rounded channel formation, the joint will follow the shape thereof, so that the underside of the joint will be smooth and flush with the ends of the wires so that the joint will not interfere with the free running action of the trolley wheel, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A mold for use in electric arc welding and casting a joint between the ends of trolley, power or like line wires for connecting the ends together while the wires are in service, and said mold comprising a pair of identical elongated substantially rectangular companion sections made from refractory electric current conducting material and having flat confronting faces, said faces being recessed along the upper inner edges thereof and the recesses cooperating with each other to provide a rounded channel groove arranged along and open throughout the longitudinal center of the upper face of the mold for fittingly receiving the end portions of the wires therein and to render the welding process clearly visible, each section having a pair of parallel bores arranged transversely therethrough adjacent the ends thereof and for disposal of the bores of one section in registration with those of the other section, bolts extending through the bores, and nuts threaded on the bolts for drawing the sections together to dispose the opposed faces of the groove in clamping engagement with said end portions for holding the latter in spaced alignment with each other to provide a welding material pocket between the same.

SOLOMON C. HEIST.